US00RE40266E

(19) United States
(12) Reissued Patent
Chase

(10) Patent Number: US RE40,266 E
(45) Date of Reissued Patent: Apr. 29, 2008

(54) DISPLAY DEVICE

(76) Inventor: Philip Cru Chase, 8 Heyden Rd., Shokan, NY (US) 12481

(21) Appl. No.: 10/041,982

(22) Filed: Apr. 26, 2002

Related U.S. Patent Documents

Reissue of:
(64) Patent No.: 6,220,555
Issued: Apr. 24, 2001
Appl. No.: 09/166,240
Filed: Oct. 5, 1998

(51) Int. Cl.
*A45D 19/04* (2006.01)

(52) U.S. Cl. ..... 248/174; 248/459
(58) Field of Classification Search ..... 248/459, 248/441.1, 174, 152; 40/124.01, 124.09, 40/124.17; 206/45.24
See application file for complete search history.

(56) References Cited

U.S. PATENT DOCUMENTS

| | | | | | |
|---|---|---|---|---|---|
| 1,694,551 | A | * | 12/1928 | Meller | 248/174 |
| 2,976,631 | A | * | 3/1961 | Paschal | 40/120 |
| 3,292,290 | A | * | 12/1966 | Potter | 40/124.09 |
| 3,739,511 | A | * | 6/1973 | Freedman | 40/124.06 |
| 4,062,138 | A | * | 12/1977 | Warenback | 40/124.16 |
| 4,143,847 | A | | 3/1979 | Cross | |
| RE30,695 | E | * | 8/1981 | Transport | 206/45.24 |
| 4,291,798 | A | * | 9/1981 | Transport | 206/45.24 |
| 4,322,905 | A | * | 4/1982 | Kruse | 40/610 |
| 4,420,077 | A | * | 12/1983 | Roccaforte | 206/780 |
| 4,493,424 | A | | 1/1985 | Smith | |
| 4,586,279 | A | * | 5/1986 | Hopkins | 40/124.09 |
| 4,817,905 | A | * | 4/1989 | Rondone | 248/459 |
| 4,825,572 | A | * | 5/1989 | Altman Robbins et al. | 40/773 |
| 4,854,060 | A | * | 8/1989 | Corbo et al. | 40/720 |
| 4,938,344 | A | * | 7/1990 | McHale et al. | 206/45.25 |
| 5,234,190 | A | * | 8/1993 | Cross | 248/459 |
| 5,458,242 | A | * | 10/1995 | Baka et al. | 206/488 |
| 5,593,025 | A | * | 1/1997 | Feibelman | 206/6.1 |
| D379,305 | S | * | 5/1997 | VanFleet | D9/457 |
| 5,660,365 | A | * | 8/1997 | Glick | 248/459 |
| D384,287 | S | * | 9/1997 | Bosworth | D10/6 |

* cited by examiner

*Primary Examiner*—Anita M. King
(74) *Attorney, Agent, or Firm*—Howard C. Miskin, Esq.; Gloria Tsui-Yip, Esq.

(57) ABSTRACT

A display device having a display section and a support section, both formed from a sheet of stiff bendable and resilient material such as heavy weight paper and thin plastic. A base panel extends horizontally across the sheet with two slots of equal length extending vertically and generally symmetrically from the base panel for a small portion of the length of the sheet. A hinge formed by a crease is located horizontally between the two slots midway between the ends of the slots forming an upper panel and a lower panel between the slots and the hinge extends on both sides of the slots across the sheet. Another hinge is located at the top of the upper panel and still another hinge is located across the top of the base panel. The sheet bends at the crease on both sides of the slots forming a front display. The upper panel and lower panel bend so that the base panel is aligned with the lower panel. The lower edge of the base panel is placed directly beneath the upper edge of the upper panel. As a result, the upper panel and the lower panel are folded together forming a rear support for the display device with the base panel beneath the rear support.

16 Claims, 2 Drawing Sheets

DISPLAY DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to display devices and more particularly to a display device that is formed from a single sheet of material requiring two slots that can be folded into a secure display device and then can be unfolded into a single sheet with the two slots to be stored.

2. Prior Art and Objects of the Invention

Display devices of various forms are known. One style of display device is the well-known easel used by artists. Small paper display devices such as a piece of cardboard or stiff paper bent in an inverted V shape have been used to reserve tables in restaurants and to announce which guest sits where at a gathering. A single sheet with a folding tab has also been used. These devices have limited durability and can be used with limited success. A display device, such as might be used in a sales situation to display items such as jewelry, requires strength and durability. Such devices can be made by known methods but are comparatively expensive and do not easily dismantle for storage.

The Rondone Patent, U.S. Pat. No. 4,817,905, teaches a display device which can be placed in a stable position for display purposes and also be folded flat. However, the Rondone device requires a series of folds and staples to hold the folds in place. The present invention avoids all staples or glues or any other external means but rather creates a stable secure display device by the interlocking forces of a single folded sheet of material from which the display device is formed and which can then be unfolded and returned to a flat sheet for storage.

Accordingly, it is an object of this invention to provide a display device which is made by folding a single sheet of material.

It is another object of this invention to provide a display device that can be unfolded and stored as a single flat sheet.

It is another object of this invention to provide a display device that is stable.

It is another object of this invention to provide a display device which is economical to produce.

It is another object of this invention to provide a display device that is readily stored.

Other objects and advantages of the present invention will become apparent to those of ordinary skill in the art as the description thereof proceeds.

SUMMARY OF THE INVENTION

The display device is formed from a single sheet of material. The material needs to be flexible and resilient and still be bendable so as to be creased to form hinges or lines of rotation between various areas of the sheet. The sheet has a front surface and a rear surface and has two sections, namely a display section and a support section. The sheet has a top edge and a bottom edge and two side edges. The sheet is preferably rectangular but the display section, in particular, may have a variety of shapes. The support section is located toward the bottom edge and the display section is located toward the top edge, The display section is a flat sheet on which objects can be mounted and words and names written or printed. The support section includes a base panel located from side edge to side edge across the bottom edge. The support section has two slots, both vertical and each generally equally spaced from one of the two side edges. Each of the slots extends from the base panel a part of the distance to the top edge. Between the two slots, an upper panel and a lower panel are located. The upper panel is hinged to the display section and the lower panel is hinged to the base panel and the upper panel and the lower panel are hinged to one another.

On both sides of the lower panel, a pair of rear panels are located. On both sides of the upper panel a pair of front panels are located. Both rear panels are hinged to the base panel and the pair of front panels are hinged to the rear panels. The hinges between the rear panels and the base panel are aligned with the hinge between the lower panel and the base panel. Likewise, the hinge between the upper panel and the lower panel is aligned with the hinges between the front panels and the rear panels.

The hinge between the lower panel and the base panel is place directly beneath the hinge between the upper panel and the display section. As a result, the rear panels are located adjacent the rear surface of the front panels.

The lower panel and the upper panel are located adjacent one another and together form a rear support which is braced by the base panel. The rear panels and the front panels together form a front support. The lower panel locks in place due to the force of the lower panel being placed against the upper panel. The front support and the rear support are the support section which retains the display section in position until the lower panel is forced away from the upper panel.

BRIEF DESCRIPTION OF THE DRAWINGS

The objects and the advantages of the invention will become apparent from the following detailed description of the preferred embodiment thereof in conjunction with the accompanying drawings in which like numerals designate like elements and in which.

DETAILED DESCRIPTION OF THE PREFERRED EMBODIMENT

Figure 1:
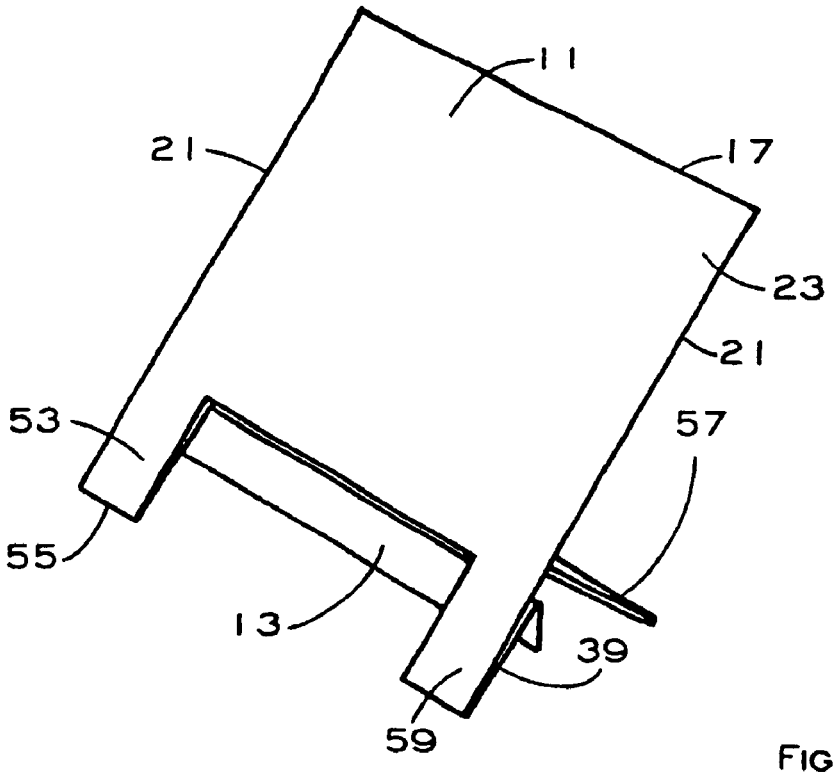
FIG. 1 is a pictorial view of the display device in its fully-folded locked position.
Figure 2:
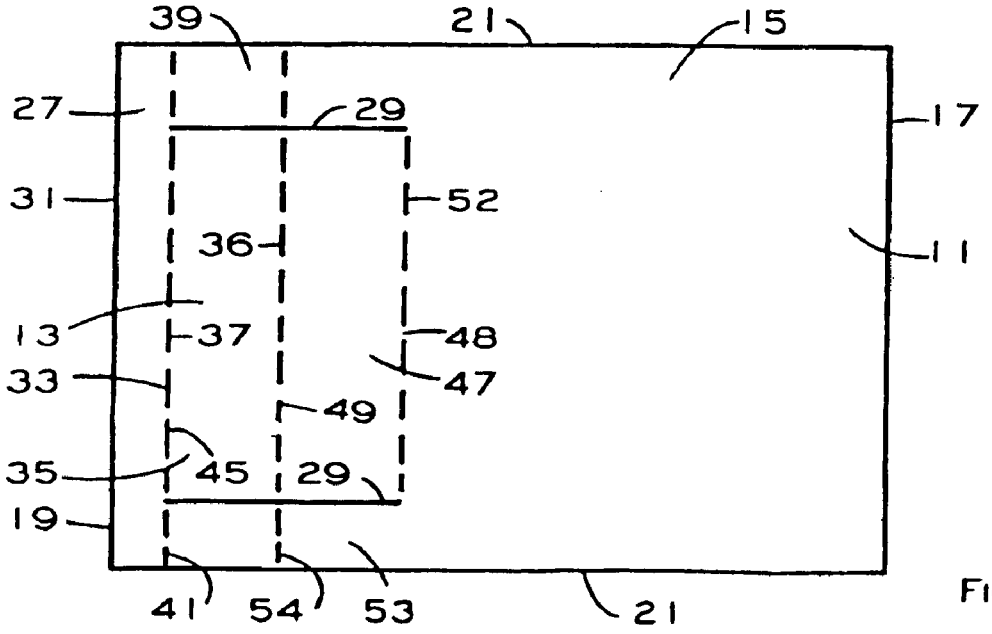
FIG. 2 is a plan view of the single sheet from which the display device is formed showing the display section and the support section with the various panels of the support section.

Referring now to FIG. 1, the display device in its fully folded locked position is shown. The display device has a display section 11 and a support section 13 on which the display section 11 stands. In FIG. 2, a sheet 15 is shown which is the display device in its fully open position prior to folding which is also its position when stored.

The sheet 15, which is shown as rectangular, but which may have various configurations, particularly in the display section 11, has a top edge 17 and a bottom edge 19 and two side edges 21. The sheet 15 has a front surface 23 (FIG 1). and a rear surface 25. As used herein the front surface 23 and rear surface 25 (FIG 3) pertain to subsections and panels, as hereinafter described, formed within the sheet 15 the same as to the entire sheet 15. A base panel 27 is located along the bottom edge 19 of the sheet 15. Extending parallel to the side edges 21 and generally at right angles to the base panel 27 are a pair of slots 29 which are cuts from the front surface 23 through the rear surface 25 of the sheet 15. The slots 29 are preferably symmetrically located between the side edges 21 and about the centerline of the sheet 15 between the side edges 21. The length of the slots 29 from the base panel 27 is a limited distance from the base panel 27 to the top edge 17 and most usually a minor portion of such distance. The distance between the slots 29 is preferably a major portion, usually about sixty percent of the width of the sheet 15 and within the range of fifty percent to seventy percent of the distance between the two side edges 21. The distance between the slots 29, which are substantially parallel to one another, is important to provide stability. The relationship between the length of the slots 29, to the length of the side edges 21 of the sheet 15, will depend on the type of display device intended and the size of the display section 11 desired.

The bottom edge 19 of the sheet 15 and a lower edge 31 of the base panel 27 are the same. The base panel 27 also has an upper edge 33. Directly above the base panel 27, between the slots 29 is a lower panel 35 and the lower panel 35 has an upper edge 36 and a lower edge 37 which is connected to the base panel 27. On both sides of the lower panel 35 are a pair of rear panels 39. Each rear panel 39 has a lower edge 41 at a hinge 43 to the base panel 27. The hinges 43 at the lower edge 41 of the rear panels 39 and a hinge 45 between lower panel 35 and the base panel 27 are aligned with one another. The term "hinge" as used herein means a crease or bend or score in the sheet 15 which permits ready bending.

Between the slots 29, and directly above the lower panel 35, is an upper panel 47. The upper panel 47 has an upper edge 48 and a lower edge 49. The lower edge 49 is located along a hinge 50 between the upper panel 47 and the upper edge 36 of the lower panel 35. The upper edge 48 of the upper panel 47 is located along a hinge 52 between the upper panel 47 and the display section 11. The hinge 52 is preferably formed by a limited crease to assure resilience. The limitation on the crease for hinge 52 may even be no crease at all so as to prepare resilience. The length of the upper panel 47 and the length of the lower panel 35 along the slots 29 is the same and to assure the locking forces necessary to hold the display device in its fully folded position. This measurement for the length of the upper panel 47 and the length of the lower panel 35 is critical to assure the locking hereinafter described. On both sides of the upper panel 47 are a pair of front panels 53. The front panels 53 have a lower edge 54 where there is a hinge 55 at the rear panels 39. The rear panels 39 and the front panels 53 have a width extending from their respective slot 29 to their respective side edge 21. The hinges 55 between the front panels 53 and the rear panels 39 are aligned with the hinge 50 between the lower panel 35 and the upper panel 47.

Once the various hinges 43, 45, 50, 52, 55 are formed and the slots 29 placed as described, the display device can be quickly placed in its operational or fully-folded position as shown in FIG. 1 from the flat position shown in FIG. 2.

Figure 3:
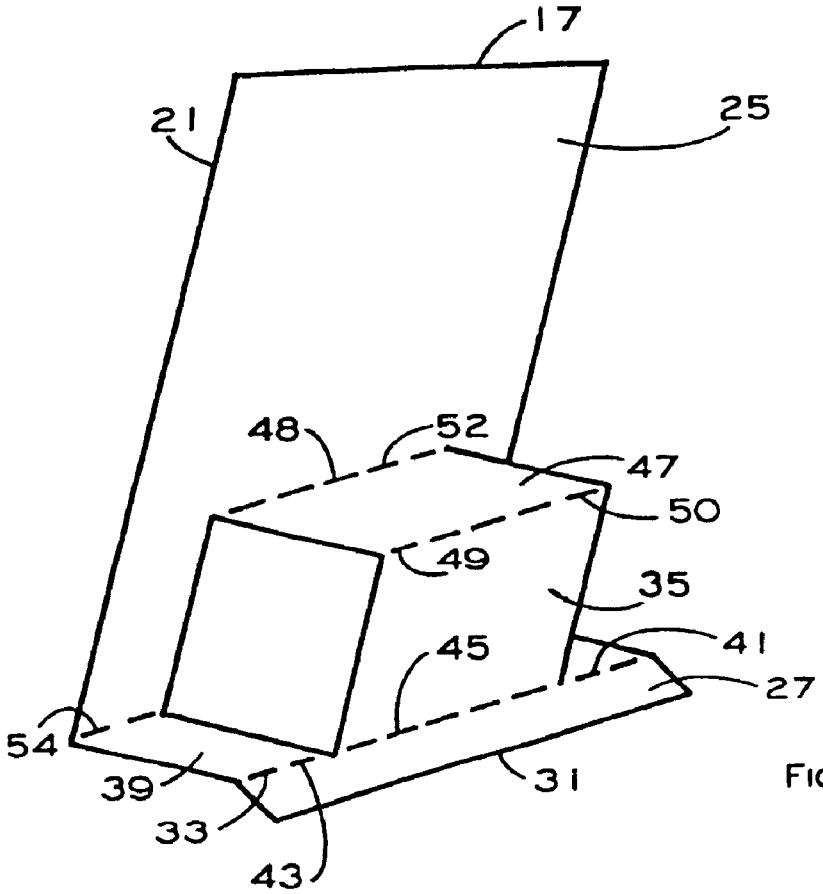
FIG. 3 is a pictorial view of the rear of the display device partially folded from the sheet position of FIG. 2 toward the completed position of FIG. 1.

In FIG. 3, the rear surface 25 of the sheet 15 is seen, and the display device is seen in an intermediate position between the flat position and the fully operational position. This intermediate position is achieved by moving the upper panel 47 outwardly from the rear surface 25 of the sheet 15. As a result, the display section 11 is vertically oriented and both rear panels 39 generally are at right angles to the display section 11. The upper panel 47 is also generally at right angles to the display section 11 and parallel with the two rear panels 39. The lower panel 35 is also most likely vertically oriented and is generally parallel to the display section 11 and the base panel 27 remains attached to the lower panel 35 and to the rear panels 39.

Figure 4:
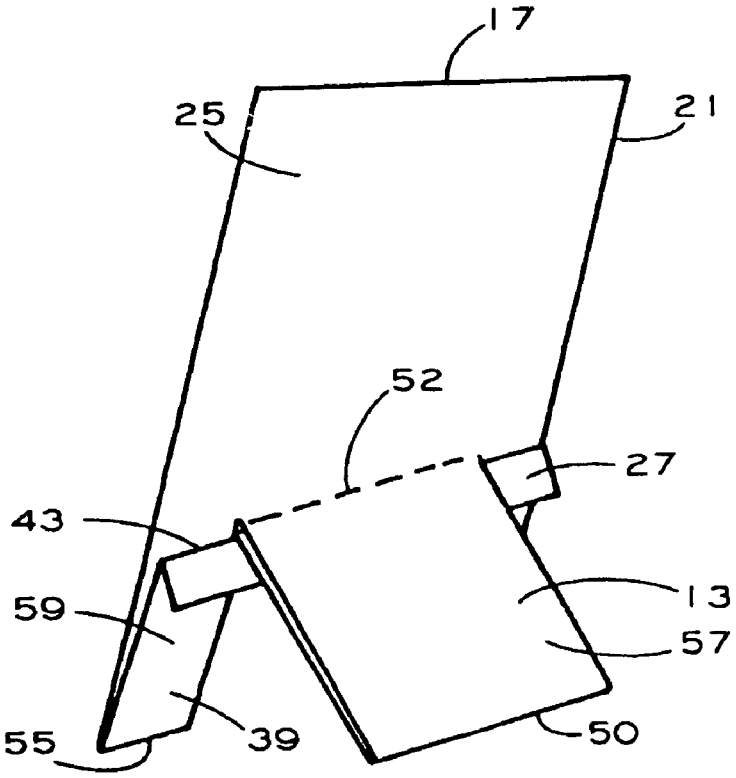
FIG. 4 is a pictorial view of the rear of the display device fully-folded into the locked position.

By placing the hinge 45 between the lower panel 35 and the base panel 27 against the hinge 52 between the upper panel 47 and the display section 11, the front surface 23 of the lower panel 35 is placed against the front surface 23 of the upper panel 47 forming, as best seen in FIG. 4, a rear leg or support 57. Simultaneously, the rear surfaces 25 of the rear panels 39 are placed against the rear surfaces 25 of the front panels 53 forming two front legs or supports 59. The base panel 27 is placed against the rear surface 25 of the lower panel 35 and serves as a stabilizer for the rear leg 57.

The length of the lower panel 35 and the upper panel 47 being substantially the same, places the rear leg or support 57 in tension and the resilience of the hinge 52 between the upper panel 47 and the display section 11 acting against the base panel 27, holds the front legs 59 and the rear legs 57 apart to a desired and an appropriate degree.

The display device is placed on the front legs 59 and the rear leg 57. The display section 11 is thus supported by the support section 13 and as seen in FIG. 1 and FIG. 4, the display section 11 is slightly inclined over the rear leg 57.

To return the display device to its flat unfolded position as seen in FIG. 2, the base panel 27 is pulled out removing the hinge 45 between the lower panel 35 and the base panel 27 from the hinge 52 between the upper panel 47 and the display section 11 which results in the intermediate position shown in FIG. 3 and then the hinge 50 between the upper panel 47 and the lower panel 35 is placed in alignment with the hinges 55 between the rear panels 39 and the front panels 53.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A display device which has a storage position as a flat sheet and an operative position when folded, such display device comprising:

a flat sheet having a display section and a support section, the support section in the storage position including:

a base panel with two slots extending from the base panel to the display section;

an upper panel and a lower panel located between the two slots, a hinge being located between the upper panel and the lower panel [and a hinge being located between the upper panel and the display section] and a hinge being located between the lower panel and the base panel;

a pair of rear panels located adjacent the lower panel, a hinge being located between the rear panels and the base panel; and a pair of front panels located adjacent the upper panel, a pair of hinges between the front panels and the rear panels, the hinges between the front panels and the rear panels being aligned with the hinge between the upper panel and the lower panel, the hinges between the rear panels and the base panel being aligned with the hinge between the lower panel and the base panel.

2. A display device according to claim 1 wherein the support section in the operative position includes the following:

*a hinge being located between the upper panel and the display panel,* the hinge between the base panel and the lower panel being beneath and adjacent the hinge between the upper panel and the display section to form a rear leg;

the rear panels being against the front panels forming a pair of front legs; and the base panel being against the rear leg to support the rear leg.

3. A display device which has a storage position as a flat sheet and an operative position when folded, such display device comprising:

a flat sheet having a top edge and a bottom edge and two side edges, the sheet having a display section adjacent the top edge and a support section adjacent the bottom edge, the support section in the storage position including:

a base panel along the bottom edge and having two slots extending from the base panel to the display section;

an upper panel and a lower panel located between the two slots, [a hinge between the upper panel and the display section] and a hinge between the lower panel and the base panel;

a pair of rear panels located between the two side edges and the slots adjacent the lower panel, a hinge being located between the rear panels and the base panel; and a pair of front panels located between the two side edges and the slots adjacent the upper panel, a pair of hinges between the front panels and the rear panels, the hinges between the front panels and the rear panels being aligned with a hinge between the upper panel and the lower panel, the hinge between the rear panels and the base panel being aligned with the hinge between the lower panel and the base panel.

4. A display [panel] *device* according to claim 3 wherein the two slots are located generally parallel to the side edges.

5. A display [panel] *device* according to claim 3 wherein the two slots are generally parallel and the distance between the two slots is in the range of fifty percent to seventy percent of the distance between the two side edges.

6. A display device which has a storage position as a flat sheet and an operative position when folded, such display device comprising:

a flat sheet having a top edge and a bottom edge and two side edges, the sheet having a display section adjacent the top edge and a support section adjacent the bottom edge, the support section in the storage position including:

a base panel along the bottom edge and having two slots extending from the base panel to the display section;

an upper panel and a lower panel located between the two slots, [a hinge between the upper panel and the display section] and a hinge between the lower panel and the base panel and a hinge between the upper panel and the lower panel;

a pair of rear panels located between the two side edges and the slots adjacent the lower panel, a hinge being located between the rear panels and the base panel; and a pair of front panels located between the two side edges and the slots adjacent the upper panel, a pair of hinges between the front panels and the rear panels, the hinge between the front panels and the rear panels being aligned with the hinge between the upper panel and the lower panel, the hinges between the rear panels and the base panel being aligned with the [hinge] *hinges* between the lower panel and the base panel; and the support section in the operative position having:

[the hinge between the base panel and the lower panel being beneath and adjacent the hinge between the upper panel and the display section] *the lower panel being placed against the upper panel* to form a rear leg;

the rear panels being against the front panels forming a pair of front legs; and the base panel being against the rear leg to support the rear leg.

7. A display [panel] *device* according to claim 6 wherein the two slots are located generally parallel to the side edges.

8. A display [panel] *device* according to claim 6 wherein the two slots are generally parallel and the distance between the two slots is in the range of fifty percent to seventy percent of the distance between the two side edges.

*9. A display device according to claim 1 wherein the support section in the operative position includes the following:*

*an area located between the upper panel and the display section,*

*the hinge between the base panel and the lower panel being beneath and adjacent to the area between the upper panel and the display section to form a rear leg,*

*the rear panels being against the front panels forming a pair of front legs; and*

*the base panel being against the rear leg to support the rear leg,*

*the resilience of the area between the upper panel and the display section acting against the base panel, holds the front legs and the rear leg apart to a desired and an appropriate.*

*10. A display device according to claim 1 wherein the device further comprises a hinge located between the upper panel and the display section.*

*11. A display device according to claim 1 wherein an area located between the upper panel and the display section is resilient.*

*12. A display device according to claim 3 wherein the device further comprises a hinge located between the upper panel and the display.*

*13. A display device according to claim 3 wherein an area located between the upper panel and the display section is resilient.*

*14. A display device according to claim 6 wherein the device further comprises a hinge located between the upper panel and the display section and the support section in the operative position has the hinge between the base panel and the lower panel beneath and adjacent the hinge between the upper panel and the display section.*

*15. A display device according to claim 6 wherein an area located between the upper panel and the display section is resilient and the support section in the operative position has the hinge between the base panel and the lower panel beneath and adjacent the area between the upper panel and the display section.*

*16. A display device according to claim 15 wherein the resilience of the area between the upper panel and the display section acts against the base panel, holding the front legs and the rear leg apart to a desired and an appropriate degree.*

* * * * *